United States Patent
Yasuda et al.

(10) Patent No.: US 8,601,012 B2
(45) Date of Patent: Dec. 3, 2013

(54) AUTOMATIC SEARCH AND TRANSFER APPARATUS AND AUTOMATIC SEARCH AND TRANSFER SYSTEM

(75) Inventors: Shinichi Yasuda, Tokyo (JP); Koichi Abe, Tokyo (JP); Shogo Tsubouchi, Tokyo (JP)

(73) Assignee: Thomson Licensing, Boulogne-Billancourt (FR)

( * ) Notice: Subject to any disclaimer, the term of this patent is extended or adjusted under 35 U.S.C. 154(b) by 0 days.

(21) Appl. No.: 12/737,933

(22) PCT Filed: Sep. 11, 2008

(86) PCT No.: PCT/JP2008/002513
§ 371 (c)(1),
(2), (4) Date: Mar. 2, 2011

(87) PCT Pub. No.: WO2010/029600
PCT Pub. Date: Mar. 18, 2010

(65) Prior Publication Data
US 2011/0153649 A1    Jun. 23, 2011

(51) Int. Cl.
*G06F 17/30*    (2006.01)
(52) U.S. Cl.
USPC ............................................. 707/758; 725/4
(58) Field of Classification Search
USPC ............. 725/4, 50, 53; 707/999.003, 999.01, 707/999.107, 758, 913
See application file for complete search history.

(56) References Cited

U.S. PATENT DOCUMENTS

| | | | |
|---|---|---|---|
| 6,374,260 B1 * | 4/2002 | Hoffert et al. | 1/1 |
| 8,260,795 B2 * | 9/2012 | Park et al. | 707/758 |
| 2004/0044725 A1 * | 3/2004 | Bell et al. | 709/203 |
| 2007/0214480 A1 | 9/2007 | Kamen | |
| 2009/0037382 A1 * | 2/2009 | Ansari et al. | 707/3 |
| 2009/0055402 A1 * | 2/2009 | Park | 707/10 |
| 2011/0016149 A1 * | 1/2011 | Sako et al. | 707/769 |
| 2011/0161409 A1 * | 6/2011 | Nair et al. | 709/203 |
| 2012/0323349 A9 * | 12/2012 | Khedouri et al. | |

FOREIGN PATENT DOCUMENTS

| | | |
|---|---|---|
| JP | 2002027369 | 1/2002 |
| JP | 2008171434 | 7/2008 |
| WO | WO2008/067017 | 6/2008 |

OTHER PUBLICATIONS

Search Rept: Sep. 21, 2009.

* cited by examiner

*Primary Examiner* — Leslie Wong
(74) *Attorney, Agent, or Firm* — Tutunjian & Bitetto, P.C.

(57) ABSTRACT

An automatic search and transfer apparatus that automatically searches for and transfers data one or more computers connected via a network, that includes a keyword input section that inputs at least one keyword, a search section that searches for data including the at least one keyword and acquires attribute data of concerned data from the one or more computers connected via the network, a reporting section that reports information relating to the concerned data to a user, a reception section that receives the concerned data from one or more computers, and a data storage section that stores the data. The reporting section reports acquisition of the attribute data to the user when the attribute data is acquired, and the reception section starts reception of the concerned data after the reporting section has reported the acquisition of the attribute data of the concerned data to the user.

9 Claims, 11 Drawing Sheets

FIG. 3

| FIELD | DESCRIPTION |
|---|---|
| UNIQUE ID | DATA IDENTIFIER |
| HOST | HOST (SERVER) THAT CREATED THE DATA |
| NEW ITEM ID | IDENTIFIER OF NEW DATA (BIN,etc.) IN THE DATA |
| NUMBER | SERIAL NUMBER |
| CREATION DATE | DATE DATA CREATED |
| MODIFICATION DATE | DATE DATA MODIFIED |
| DELETION DATE | DATE DATA PUT INTO TRASH |
| VIDEO FORMAT | VIDEO FORMAT OF ACTUAL DATA |
| CURRENT STATUS | STATUS OF ACTUAL DATA (UNUSABLE/COPYING/USABLE) |
| IN POINT | PLAYBACK START POINT RECORDED IN ACTUAL DATA |
| OUT POINT | PLAYBACK FINISH POINT RECORDED IN ACTUAL DATA |
| DURATION | LENGTH OF ACTUAL DATA |
| TITLE | TITLE |
| KEYWORDS | KEYWORD(S) (UP TO, e.g., THREE MAY BE REGISTERED) |
| RATING | IMPORTANCE OF ACTUAL DATA |
| ICON | ID INDICATING THE FORM OF AN ICON |
| THUMBNAIL | ID INDICATING THE FORM OF A THUMBNAIL |

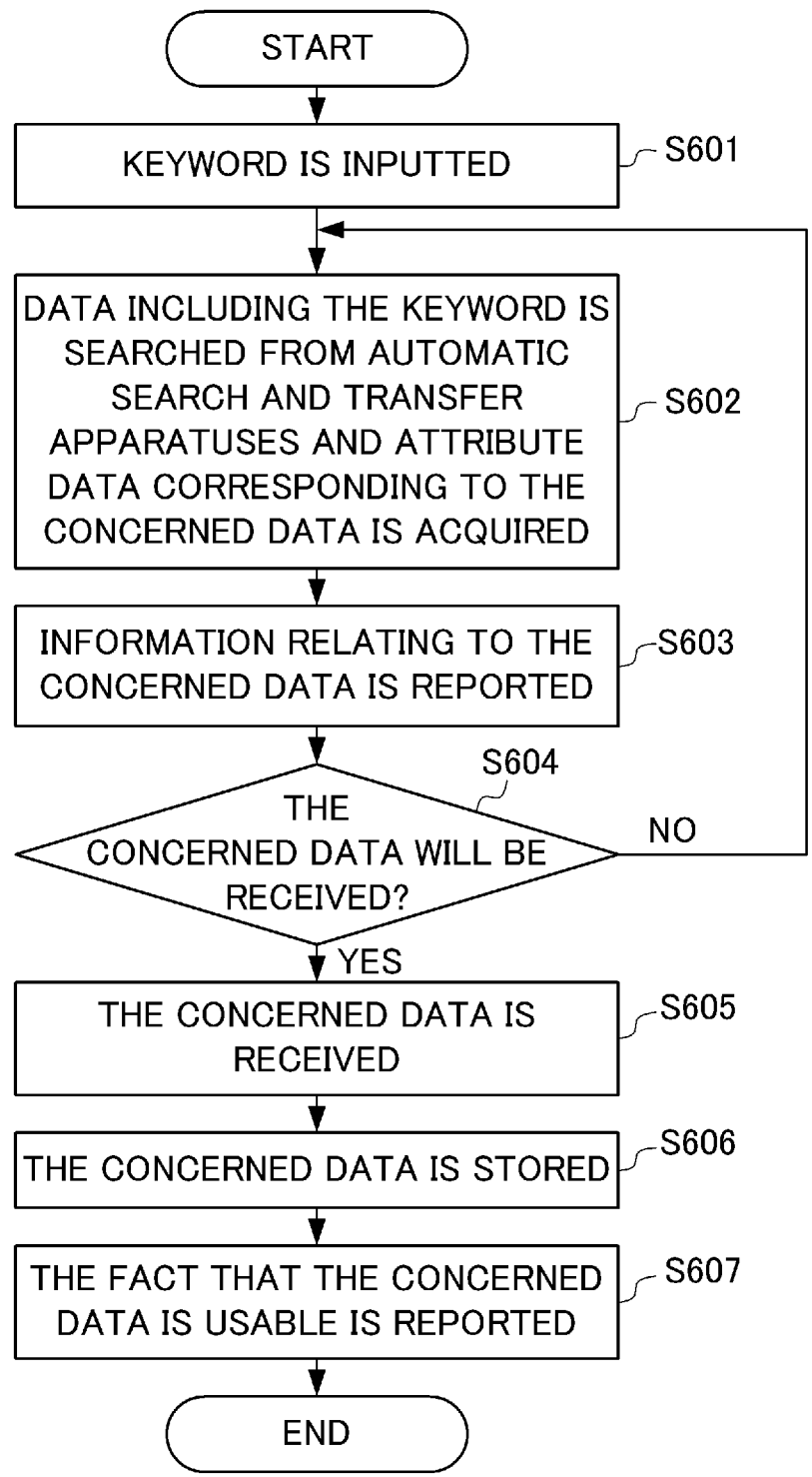

AUTOMATIC SEARCH AND TRANSFER APPARATUS AND AUTOMATIC SEARCH AND TRANSFER SYSTEM

This application claims the benefit, under 35 U.S.C. §365 of International Application PCT/JP2008/002513, filed Sep. 11, 2008, which was published in accordance with PCT Article 21(2) on Mar. 18, 2010 in English.

TECHNICAL FIELD

The present invention relates to an automatic search and transfer apparatus and an automatic search and transfer system for searching for and collecting desired data from computers, which are connected via a network or the like and save data, and more particularly, to an automatic search and transfer apparatus and automatic search and transfer system for searching for and collecting desired data from computers, which are connected via a network or the like and save data, in advance such that a user will be able to use the desired data immediately.

BACKGROUND ART

Conventionally, in data processing where real time performance is required, for example, in operation of an editing apparatus that is employed in a live relay of sport or the like in the field of broadcasting, given image data captured by cameras that are disposed at plural locations, it is necessary to search for required image data from respective computers (terminals) storing the image data, and to rapidly collect and perform editing work on the image data. For this, it is necessary to find data that is to be used from computers that are connected via a wireless or wired network or the like and that store large volumes of data, such as plural quantities of image data or the like, to collect the data that is to be used in one place, and to prepare the data into a usable state in advance.

As a technology that selects and supplies required data, a technology is disclosed in Japanese Unexamined Patent Publication No. 2002-27369 which: employs a database to administer profile data of a plurality of users, accepts a selection condition for selecting specific users to whom advertising information is to be distributed, and receives the advertising information; and selects specific users to be distributed to on the basis of the accepted selection condition and the administered profile data, and uses a digital broadcasting system to distribute the advertising information to the selected specific users. Further, as a technology that searches for image data that is required, a technology is disclosed in, for example, Japanese Unexamined Patent Publication No. 2008-171434 which searches for video data or a video data portion showing a subject, meaning a desired object, space or the like, from large amounts of video data accumulated in a recording apparatus, with positional data of the subject as a key.

DISCLOSURE OF INVENTION

Problems to be Solved by the Invention

As a computer that stores plural quantities of large-volume data such as video or the like, the employment of, for example, a video server that administers video data has been considered. However, in a case where a title of video data or a portion of video data is employed to search for video data that is to be used from local computers, which are disposed at respective relay locations, and the video data is copied to a predetermined area of the video server, there are usually various problems.

For example, in a case where video data is copied from a local computer to a video server, if data that should be used is added at the local computer after the search has been executed, a repeat search is necessary. Furthermore, in a case where it is necessary to use data immediately, with large-volume data that requires a period of time until a transfer is completed, such as video data, there may be a time lag from deciding to employ the data to attaining a state in which employment thereof is possible.

There are technologies which, in order to simplify a procedure of finding data, which is an objective thereof, automatically search for data by titles, designated markers and the like that are attached to the data, and collect the data at a predetermined location. However, these give searches in limited ranges within respective computers and the like, and do not go so far as to collect data that is created in computers connected through a network.

Accordingly, it is an object of the present invention to provide an automatic search and transfer apparatus and automatic search and transfer system in which a condition for finding data that is desired is specified beforehand, and that continuously monitor data created in network-connected computers, automatically collect data that matches the condition, and put the data into a usable state.

Means for Solving the Problems

In accordance with a first aspect of the present invention, there is provided an automatic search and transfer apparatus that automatically searches for and transfers data from a computer connected via a network, the apparatus comprising: a keyword input section that inputs a keyword; a search section that searches for data including the keyword and acquires attribute data of concerned data from the computer connected via the network; a reporting section that reports information relating to the concerned data; a reception section that receives the concerned data; and a data storage section that stores the data, wherein the reporting section reports acquisition of the attribute data of the concerned data when the attribute data is acquired, and the reception section starts reception of the concerned data after the reporting section has reported the acquisition of the attribute data of the concerned data.

The data may be large-volume data such as video data or the like. According to the present invention, since the automatic search and transfer apparatus comprises: a keyword input section that inputs a keyword; a search section that searches for data including the keyword and acquires attribute data of concerned data from the computer connected via the network; a reporting section that reports information relating to the concerned data; a reception section that receives the concerned data; and a data storage section that stores the data, by specifying, for example, a keyword as a condition for finding desired data beforehand, the automatic search and transfer apparatus can constantly monitor data created at network-connected computers, automatically collect data that matches conditions such as the keyword and the like, and put it into a usable state. Further, since the reporting section reports acquisition of the attribute data of the concerned data when the attribute data is acquired, and the reception section starts reception of the concerned data after the reporting section has reported the acquisition of the attribute data of the concerned data, the user can be reported to in advance of reception of the actual data, and a response may be considered.

According to the present invention, the reporting section reports the acquisition of the attribute data of the concerned data, and the reception section may start the reception of the concerned data after receiving an instruction for the reception of the concerned data.

Therefore, in the automatic search and transfer apparatus according to the present invention, since the reporting section reports the acquisition of the attribute data of the concerned data, the reception section can start the reception of the concerned data after receiving an instruction for the reception of the concerned data, and the user can refuse to receive the actual data of the concerned data file, if necessary, even in cases where the data is large-volume data, such as video data or the like, system resources can be utilized efficiently.

According to the present invention, the search section may search for data including the keyword from the computer at predetermined time intervals, and in a case where concerned data has been newly added at the computer, the reporting section may report information relating to the newly added concerned data, the reception section may receive the newly added concerned data, and the data storage section may store the newly added concerned data.

Therefore, since, in the automatic search and transfer apparatus according to the present invention, the search section searches for data including the keyword from the computer at predetermined time intervals, and in a case where concerned data has been newly added at the computer, the reporting section reports information relating to the newly added concerned data, the reception section receives the newly added concerned data, and the data storage section stores the newly added concerned data, even in a case where data that is to be used is added at a local computer, the data may be retained in an immediately usable state without there being a time lag from deciding to employ the data to attaining a state in which employment is possible.

According to the present invention, the search section may search for data including the keyword from the computer at predetermined time intervals, and in a case where concerned data previously stored at the data storage section has been deleted at the computer, the reporting section may report information relating to the concerned data that has been deleted at the computer, and the data storage section may delete the concerned data that has been deleted at the computer.

Therefore, since, in the automatic search and transfer apparatus according to the present invention, the search section searches for data including the keyword from the computer at predetermined time intervals, and in a case where concerned data previously stored at the data storage section has been deleted at the computer, the reporting section reports information relating to the concerned data that has been deleted at the computer, and the data storage section deletes the concerned data that has been deleted at the computer, even in a case where data that is to be used is deleted at a local computer, the data already in the hard disk drive may be deleted too. Thus, even in cases where the data is large-volume data, such as video or the like, system resources can be utilized efficiently.

According to the present invention, the search section may search for data including the keyword from the computer at predetermined time intervals, and in a case where concerned data previously stored at the data storage section has been modified at the computer, the reporting section may report information relating to the modified concerned data, the reception section may receive the modified concerned data, and the data storage section may replace the concerned data previously stored at the data storage section with the modified concerned data.

Therefore, since, in the automatic search and transfer apparatus according to the present invention, the search section searches for data including the keyword from the computer at predetermined time intervals, and in a case where concerned data previously stored at the data storage section has been modified at the computer, the reporting section may report information relating to the modified concerned data, the reception section may receive the modified concerned data, and the data storage section may replace the concerned data previously stored at the data storage section with the modified concerned data, the data saved in the storage section can be constantly updated to match the data at the local computers, such that a user can immediately use the most up-to-date data.

According to the present invention, when the data is stored at the data storage section, the reporting section reports to a user that the data is transferable.

Therefore, since, in the automatic search and transfer apparatus according to the present invention, when the data is stored at the data storage section, the reporting section reports to a user that the data is transferable, the user can be constantly informed of the usable data.

According to the present invention, when the data is deleted from the data storage section, the reporting section may report to a user that the data is untransferable.

Therefore, since, in the automatic search and transfer apparatus according to the present invention, when the data is deleted from the data storage section, the reporting section may report to a user that the data is untransferable, the user can be constantly informed of the unusable data.

According to the present invention, when the data stored at the data storage section is modified, the reporting section reports to a user that the data has been modified.

Therefore, since, when the data stored at the data storage section is modified, the reporting section may report to a user that the data has been modified, the user may be constantly informed of the current state of the data.

In accordance with a second aspect of the present invention, there is provided an automatic search and transfer system comprising an automatic search and transfer apparatus for each of a plurality of groups each having one or more computers connected via a network, the automatic search and transfer apparatus being operative to automatically search for and transfer data from a computer connected via a network, and apparatus including: a keyword input section that inputs a keyword;

a search section that searches for data including the keyword and acquires attribute data of concerned data from the computer connected via the network; a reporting section that reports information relating to the concerned data; a reception section that receives the concerned data; and a data storage section that stores the data, wherein the reporting section reports acquisition of the attribute data of the concerned data when the attribute data is acquired, and the reception section starts reception of the concerned data after the reporting section has reported the acquisition of the attribute data of the concerned data, wherein in one automatic search and transfer apparatus of one group selected from the plurality of groups, the search section is operative to search for data including the keyword and acquire attribute data of concerned data from the automatic search and transfer apparatuses of the other groups, the reporting section is operative to report information relating to the concerned data; the reception section is operative to receives the concerned data; and the data storage section is operative to store the data, the reporting section is operative to report acquisition of the attribute data of the concerned data when the attribute data is acquired, and the reception section is operative to start reception of the concerned data after the reporting section has reported the acquisition of the attribute data of the concerned data.

According to the present invention, since the automatic search and transfer system comprising an automatic search and transfer apparatus according to the present invention comprises: an automatic search and transfer apparatus for each of a plurality of groups each having one or more computers connected via a network, the automatic search and transfer apparatus including: a keyword input section that inputs a keyword; a search section that searches for data including the keyword and acquires attribute data of concerned data from the computer connected via the network; a reporting section that reports information relating to the concerned data; a reception section that receives the concerned data; and a data storage section that stores the data, by specifying, for example, a keyword as a condition for finding desired data beforehand, the automatic search and transfer system can constantly monitor data created at network-connected computers, automatically collect data that matches conditions such as the keyword and the like, and put it into a usable state. Further, since the reporting section reports acquisition of the attribute data of the concerned data when the attribute data is acquired, and the reception section starts reception of the concerned data after the reporting section has reported the acquisition of the attribute data of the concerned data, the user is reported to in advance of reception of the actual data, and a response may be considered.

BRIEF DESCRIPTION OF THE DRAWINGS

FIG. 3 is a table showing an example of attribute data used for the automatic search and transfer apparatus shown in FIG. 1;

FIG. 11 is a flowchart explaining an example of automatic search and transfer processing which is executed by the automatic search and transfer apparatus system in FIG. 10.

Figure 1:
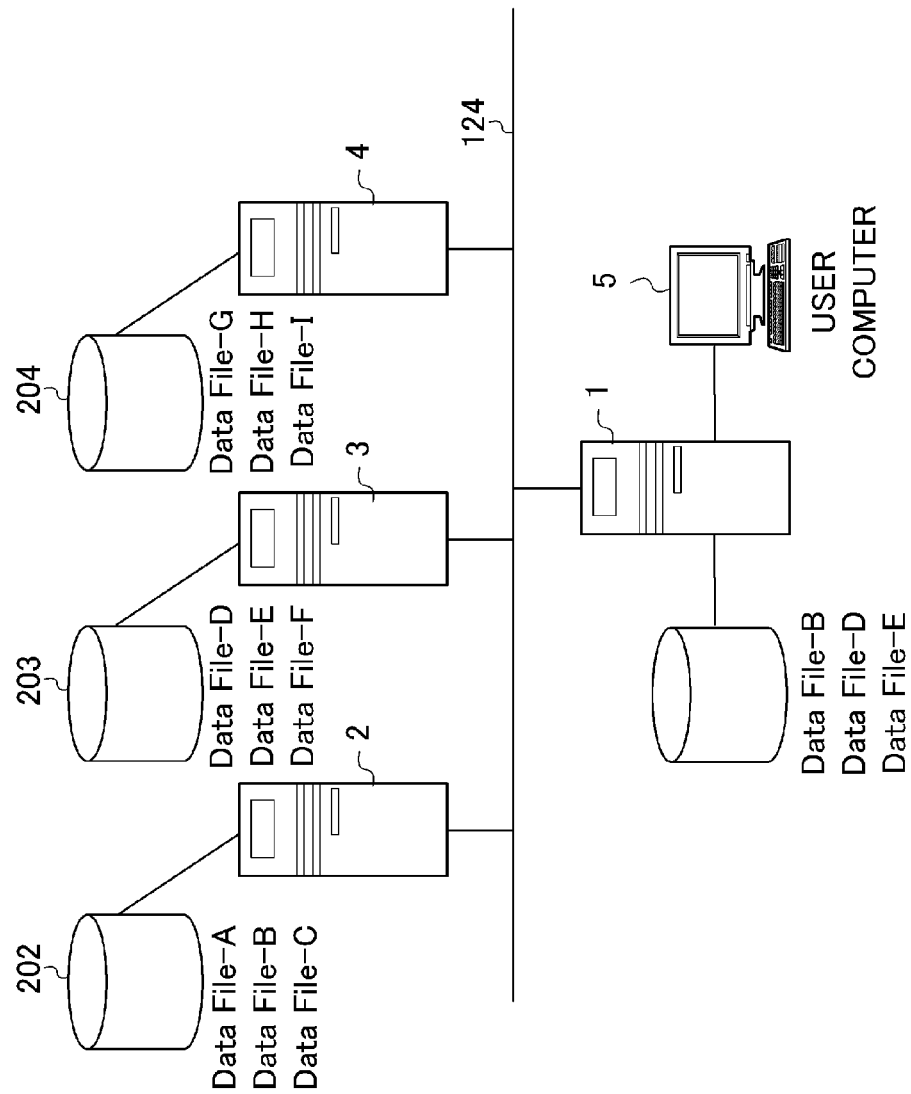
FIG. 1 is a schematic block diagram showing a first embodiment of an automatic search and transfer apparatus according to the present invention, connected with a plurality of computers via a network.

EXPLANATION OF THE NUMERAL REFERENCES 1, 100 to 400 Automatic search and transfer apparatus
2~4 Computer
5, 500 User computer terminal
106 Image server
111 Controller
112 Keyboard
113 Mouse
135 System monitor
210 Display
315 Transmission and reception section
361 Hard disk controller
362 Hard disk drive
391 Controller controlling portion

DETAILED DESCRIPTION

Concrete embodiments of the present invention are described below with reference to the accompanying drawings.

(First Embodiment)

Firstly, schematics of a first embodiment of an automatic search and transfer apparatus according to the present invention are described with reference to FIG. 1 to FIG. 3.

FIG. 1 shows a first embodiment of an automatic search and transfer apparatus 1, connected, via a network, to a user computer terminal 5, and computers 2, 3 and 4. The computer 2 includes a data storage section 202 that stores data files A to C, the computer 3 includes a data storage section 203 that stores data files D to F, and the computer 4 includes a data storage section 204 that stores data files G to I. The present embodiment of the automatic search and transfer apparatus 1 automatically searches the computers 2,3 and 4 on the basis of a keyword/keywords inputted by the user directly or through the user computer terminal 5, collects concerned data files that include the keyword(s)-B, D and E-and transfers the data files B, D, E to the user computer terminal 5 as necessary.

Figure 2:
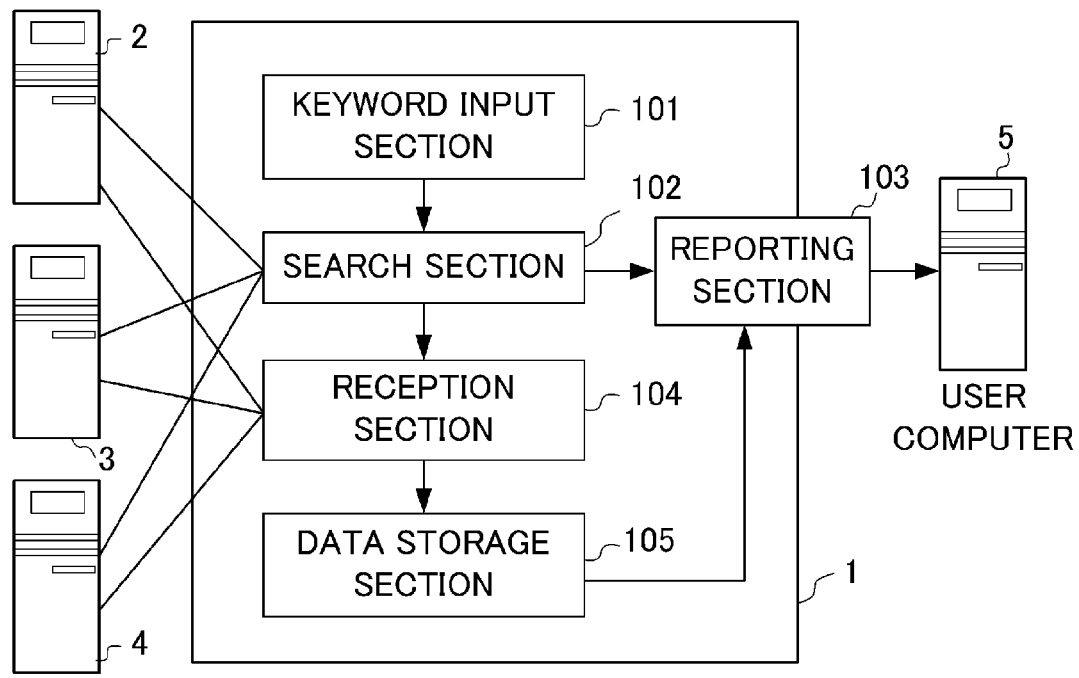
FIG. 2 is a functional block diagram of the automatic search and transfer apparatus shown in FIG. 1.

FIG. 2 is a functional block diagram showing the present embodiment of the automatic search and transfer apparatus 1. The present embodiment of the automatic search and transfer apparatus 1 is adapted to automatically search for data from computers 2 to 4, and transfer the data to the user computer terminal 5 as necessary. As shown in FIG. 2, the automatic search and transfer apparatus 1 comprises a keyword input section 101 that inputs a keyword, a search section 102 that searches for data including the keyword and acquires attribute data of the data including the keyword, referred to herein as "concerned data", a reporting section 103 that reports information relating to the concerned data to the user computer terminal 5, a reception section 104 that receives the concerned data, and a data storage section 105 that stores the data. The reporting section 103 is adapted to report acquisition of the attribute data of the concerned data when the attribute data is acquired. The reception section 104 starts reception of the concerned data, i. e., concerned data file, after the reporting section 103 has reported the acquisition of the attribute data of the concerned data. This means that if the user operating the user computer terminal 5 judges that the concerned data is unnecessary after the consideration of the attribute data acquired by the automatic search and transfer apparatus 1, the user can refuse to receive the actual data of the concerned data file.

FIG. 3 is a table showing an example of attribute data reported by the reporting section 103. As shown in FIG. 3, the attribute data includes proxy data such as a file name or a portion of data, permitting the user to identify what the data is about. However, the present invention is not limited thus. The attribute data may include any other information such as a data size, and the reporting section 103 may report the attribute data in whole or in part. Further, each item of the attribute data is illustrated only by an example. It is appreciated that the present invention does not necessitate all of the items. In the present embodiment, a keyword is specified as a condition for finding desired data beforehand, the keyword is not limited to a file name or a portion of data, but may be any information as long as the information can identify the attribute data shown in FIG. 3. Further, two or more keyword may be inputted.

Figure 4:
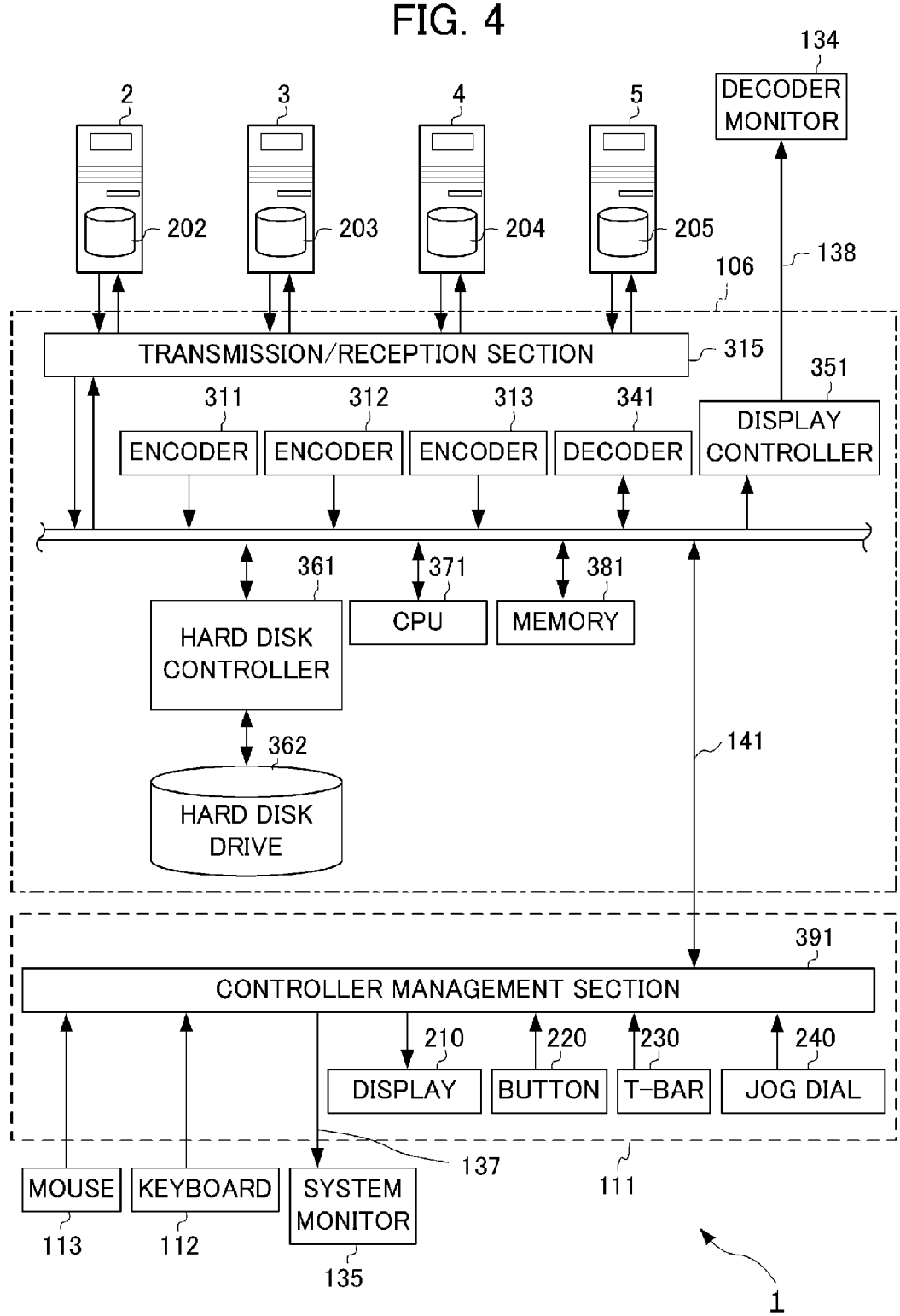
FIG. 4 is a block diagram of the automatic search and transfer apparatus shown in FIG. 1.

FIG. 4 is a circuit block diagram showing the present embodiment of the automatic search and transfer apparatus 1 according to the present invention. As shown in FIG. 4, the automatic search and transfer apparatus comprises an image server 106, a controller 111, a keyboard 112, a mouse 113, cameras 121 to 123, camera monitors 131 to 133, a decoder monitor 134, a system monitor 135, and the like. Each of the components forming the automatic search and transfer apparatus 1 is connected using, for example, a LAN (Local Area Network) 141 to connect the image server 106 and the controller 111, a cable 124 to connect the image server 106 and the computers 2 to 5 (see FIG. 1), a cable 138 to connect the image server 106 and the decoder monitor 134, and a cable 137 to connect the controller 111 and the system monitor 135, etc. However, the method of connection is not limited thereto, and may include any other wired or wireless connection methods if appropriate. It should be noted that the image server 106 may also be configured as a single unit integrating the controller 111.

The computers 2, 3, 4 include respective data storage sections 202, 203, 204 for storing data. Each of the data storage sections 202, 203, 204 may be constructed by a hard disk drive. The image server 106 is provided with encoders 311 to 313, a transmission and reception section 315, a decoder 341, a display controller 351, a hard disk controller 361, a hard disk drive 362, a CPU 371, and a memory 381, each of which is connected to a bus via which communication therebetween is possible. The image server 106 is adapted to send and receive signals with the computers 2 to 4, and the user computer terminal 5 through the transmission and reception section 315. The image server 106 stores attribute information of the data received from each of the computers 2 to 4 in the memory 381. Further, the image server 106 encodes, for example, a moving image signal received from the computers 2 to 4 through the transmission and reception section 315 into an encoded moving image signal, and stores the encoded moving image signal in the hard disk drive 362 as moving image data. The transmission and reception section 315 constitutes the reception section 104 that has been described with reference to FIG. 2. Further, the image server 106 decodes the moving image data into a moving image signal, and sends the moving image signal to the decoder monitor 134. The decoder monitor 134 displays moving images based on the moving image signal received from the image server 106. The decoder monitor 134 also displays the moving images received from the computers 2 to 5. The term "moving image" herein used includes a "still image", as well. The decoder 341 reads out encoded moving image data from the hard disk drive 362, decodes the encoded moving image data and sends the moving image signal thus decoded to the display controller 351 or the like.

The controller 111 sends and receives signals via the image server 106 and the LAN 141, and displays a user interface on the display screen, based on the signal sent from the image server 106 and the user input. Furthermore, the controller 111 converts user input that has been input by the mouse 113, by the keyboard 112 or by the controller 111 itself to a signal, and sends the signal to the image server 106. In addition, the controller 111 sends the signal for displaying the user interface to the system monitor 135 via the cable 137. The controller 111, the keyboard 112, and the mouse 113 constitute the keyword input section 101 that has been described with reference to FIG. 2.

The computers 2 to 4 sends moving image signals stored in respective data storage sections 202, 203, 204 to the image server 106 through the cable 124. The data storage section 202 of the computer 2 stores data files A to C, the data storage section 203 of the computer 3 stores data files D to F, The data storage section 204 of the computer 4 stores data files G to I.

The hard disk drive 362 constitutes the data storage section 202, that has been described with reference to FIG. 2, stores programs that are to be executed by the CPU 371, and encoded moving image data sent from the encoders 311 to 313. Furthermore, the hard disk drive 362 may be provided either within the image server 106, outside of the image server 106, or both within the image server 106 and outside of the image server 106. Moreover, for explanatory purposes, the hard disk drive 362 is described as the data storage section in the present embodiment; however, the present invention is not limited thereto. So long as it is capable of storing moving image data or moving image signals, any memory device, for example, a tape drive, an optical disk drive, a large volume semiconductor memory, or any combination thereof, maybe used.

The CPU 371 reads out programs stored in the memory 381, and executes each type of processing in accordance with the programs contained therein. The programs executed by the CPU 371 include, for example, applications for editing or replaying moving image data, an OS (Operating System) for controlling each of the devices connected to the bus, and so on.

The memory 381 stores programs that have been read out from the hard disk drive 362. The programs include, for example, applications for editing or playing back moving image data in response to input and output from the controller 111, and an OS for controlling each of the devices connected to the bus, and so on. Furthermore, the memory 381 may store the moving image signals and data from the devices connected to the bus.

The decoder monitor 134 is connected to the display controller 351, and displays moving images based on the moving image signal, such as a VGA signal, sent from the display controller 351. The decoder monitor 134 is used when the content of the moving image signal is to be monitored; however, it is not necessarily required in the configuration of the image processing system 100.

Furthermore, the controller 111 is provided with a controller controlling portion 391, a display 210, button groups 220, a T-bar 230, and a jog dial 240.

The controller controlling portion 391 is provided with a CPU and memory (not shown). The controller controlling portion 391 sends to and receives from the image server 106 signals, sends a signal for displaying the user interface to the display 210 and the system monitor 135, and sends request commands and input data received as input from the button group 220, the T-bar 230, the jog dial 240, the keyboard 112, and the mouse 113 to the image server 106. The attribute information of the data including the keyword is displayed by the display 210 or by the decoder monitor 134. The display 210 or the decoder monitor 134 constitutes the reporting section 103 that has been described with reference to FIG. 2.

Then, the operation carried out by the automatic search and transfer apparatus 1 is described.

Figure 5:
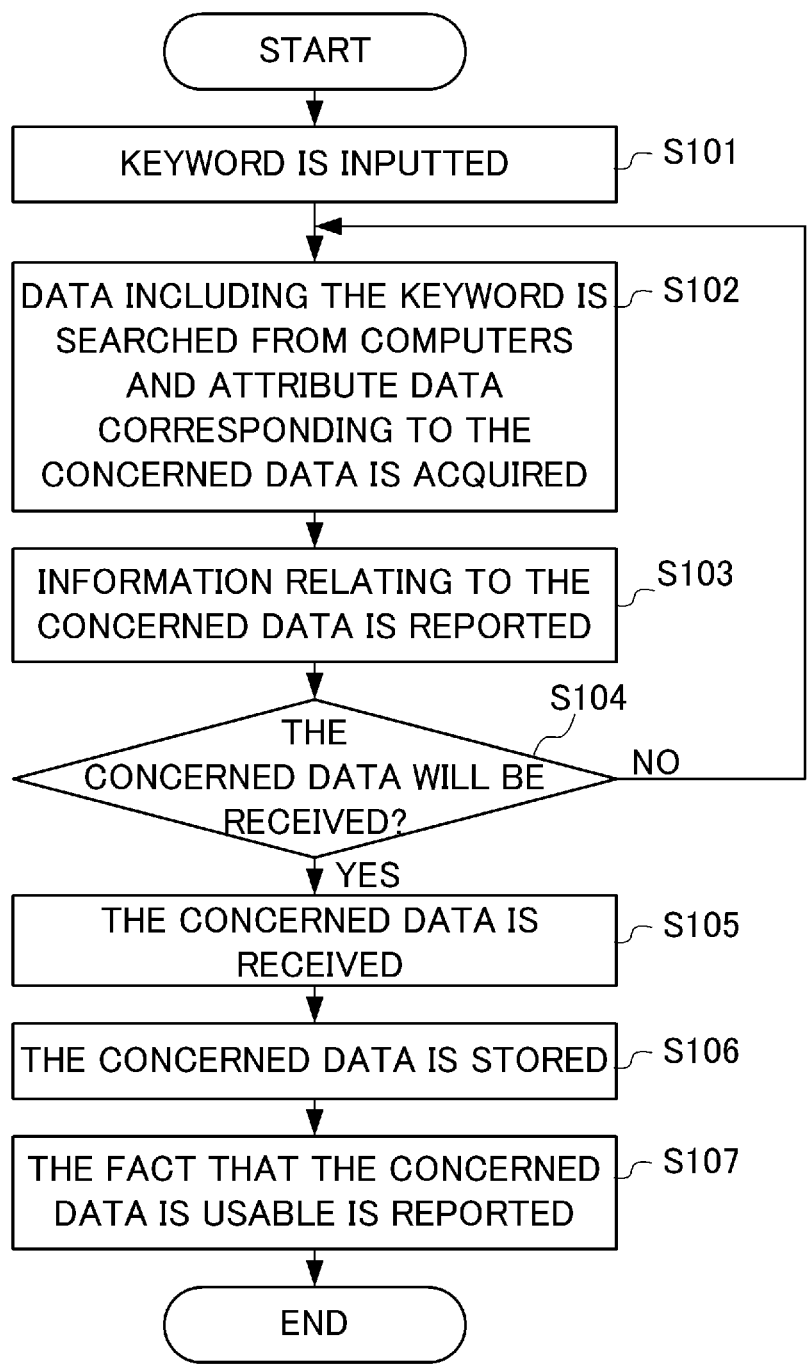
FIG. 5 is a flowchart explaining an example of automatic search and transfer processing which is executed by the automatic search and transfer apparatus shown in FIG. 1.

FIG. 5 is a flowchart describing an example of automatic search and transfer processing which is executed by the automatic search and transfer apparatus 1 that has been described with reference to FIG. 1 to FIG. 4. In the automatic search and transfer apparatus 1 shown in FIG. 4, the CPU 371 constituting the control section instructs the controller control section 391, and displays the user interface at the display 210 and the system monitor 135.

Referring to FIG. 5, firstly, in Step S101, a user operates the keyboard 112, the mouse 113 or the like, and inputs a preferred keyword. Specifically, the CPU 371 stores the keyword inputted by the user in the memory 381, via the controller control section 391. In Step S102, the CPU 371 searches for data including the inputted keyword from the computers 2 to 4, and acquires corresponding attribute data. Specifically, the CPU 371 controls the transmission and reception section 315 and sends, to the computers 2 to 4, signals enquiring as to whether or not the computers 2 to 4 have data including the keyword stored in the memory 381 and, in cases where the computers 2 to 4 have data including the keyword, requesting that attribute data of the data including the keyword, i. e., concerned data be sent. In a case where concerned data is present in the computers 2 to 4, the attribute data of the concerned data, which is sent from the computers 2 to 4, is received via the transmission and reception section 315 and saved in the memory 381. The CPU 371, the memory 381 and the transmission and reception section 315 constitute the search section 102 that has been described with reference to FIG. 2.

In Step S103, information relating to the concerned data is reported. Specifically, the CPU 371 reports to the user the attribute data of the concerned data saved in the memory 381. This means that the CPU 371 controls the controller control section 391 to display the attribute data at the display 210. In Step S104, the CPU 371 determines whether or not to receive the whole of concerned data. Specifically, the CPU 371 determines whether or not an instruction to receive the whole of the concerned data has been inputted by the user. If it is determined that the user has operated the keyboard 112, the mouse 113 or the like and inputted an instruction to receive the concerned data via the controller control section 391, the processing advances to Step S105, and the concerned data is received. Specifically, in Step S105, the CPU 371 controls the transmission and reception section 315 to receive the concerned data. On the other hand, if the CPU 371 determines that an instruction to receive the concerned data has not been inputted by the user, the processing returns to Step S102.

In Step S106, the data is stored. Specifically, the CPU 371 controls a hard disk controller 361 to save the received data in the hard disk drive 362. In Step S107, it is reported that the concerned data is usable. Specifically, the CPU 371 controls the controller control section 391 to display the fact that the concerned data is usable at the display 210. Therefore, when a user operates the controller control section 391 and requests desired data from the stored data, the CPU 371 can send concerned data from the data saved in the hard disk drive 362 to the user computer 5, via the transmission and reception section 315, in real time. Moreover, because the reception of concerned data is started after the acquisition of the attribute data of the concerned data has been reported via the display 210, a user may consider reception of the whole of actual data in advance, and not carry out reception of the whole actual data in cases where this is unnecessary. Thus, even in cases where the data is large-volume data, such as video or the like, system resources can be utilized efficiently.

FIG. 6 to FIG. 9 are flowcharts describing an example of data modification processing which continuously updates data stored at the automatic search and transfer apparatus 1 that has been described with reference to FIG. 1 to FIG. 5.

Figure 6:
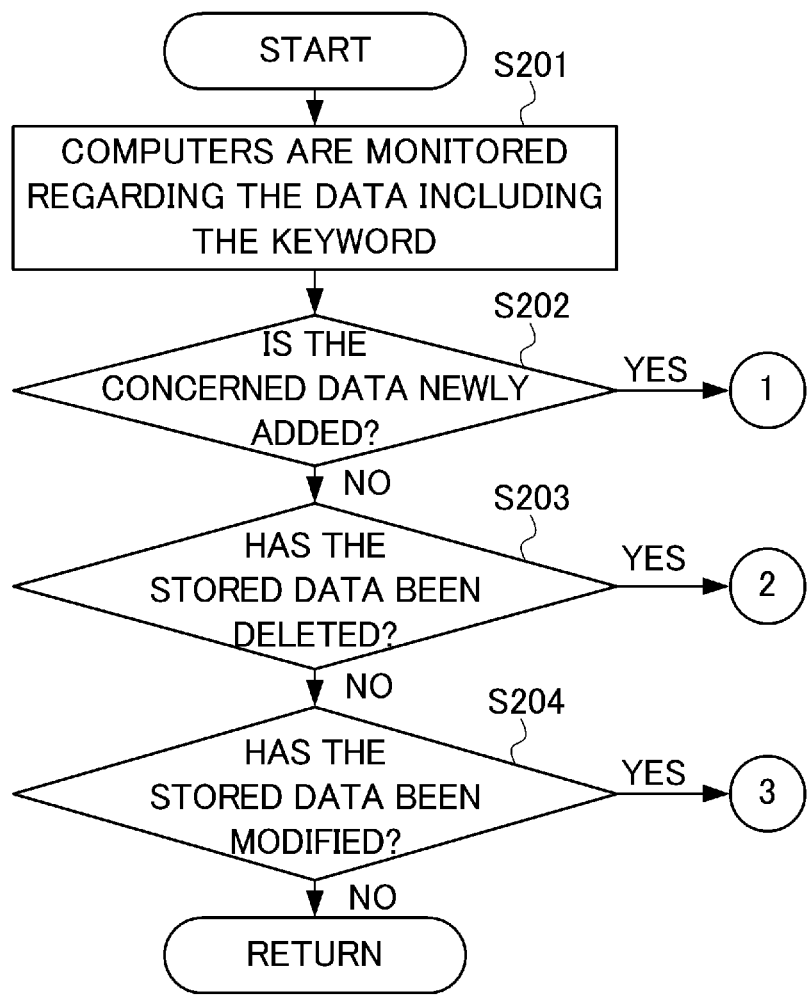
FIG. 6 is a flowchart explaining an example of update processing carried out by the automatic search and transfer apparatus shown in FIG. 1.

Referring to FIG. 6, in Step S201, the computers 2 to 4 are monitored for whether data saved in the computers 2 to 4 has been updated relative to data saved in the hard disk drive 362. Specifically, at predetermined time intervals, the CPU 371 sends, to the computers 2 to 4, signals enquiring as to whether or not the computers 2 to 4 have data including the keyword stored in the memory 381 and, in cases where the computers 2 to 4 have data including the keyword, requesting that attribute data of the concerned data be sent. In a case where concerned data is present in the computers 2 to 4, the attribute data of the concerned data, which is sent from the computers 2 to 4, is received via the transmission and reception section 315.

In Step S202, it is determined whether or not the concerned data is newly added data. Specifically, the CPU 371 refers to the creation date in the attribute data of the received concerned data, and determines whether or not the concerned data has been created since a previous update date. In a case where the creation date in the attribute data is subsequent to the previous update date, the CPU 371 determines that the concerned data is newly added data, and executes data addition processing, which is described below. In a case where the creation date of the attribute data is not subsequent to the previous update date, the CPU 371 determines that the concerned data is not newly added data and advances to Step S203, but in the case where it is determined that the concerned data is newly added data, the CPU 371 advances to (1) (FIG. 7).

Figure 8:
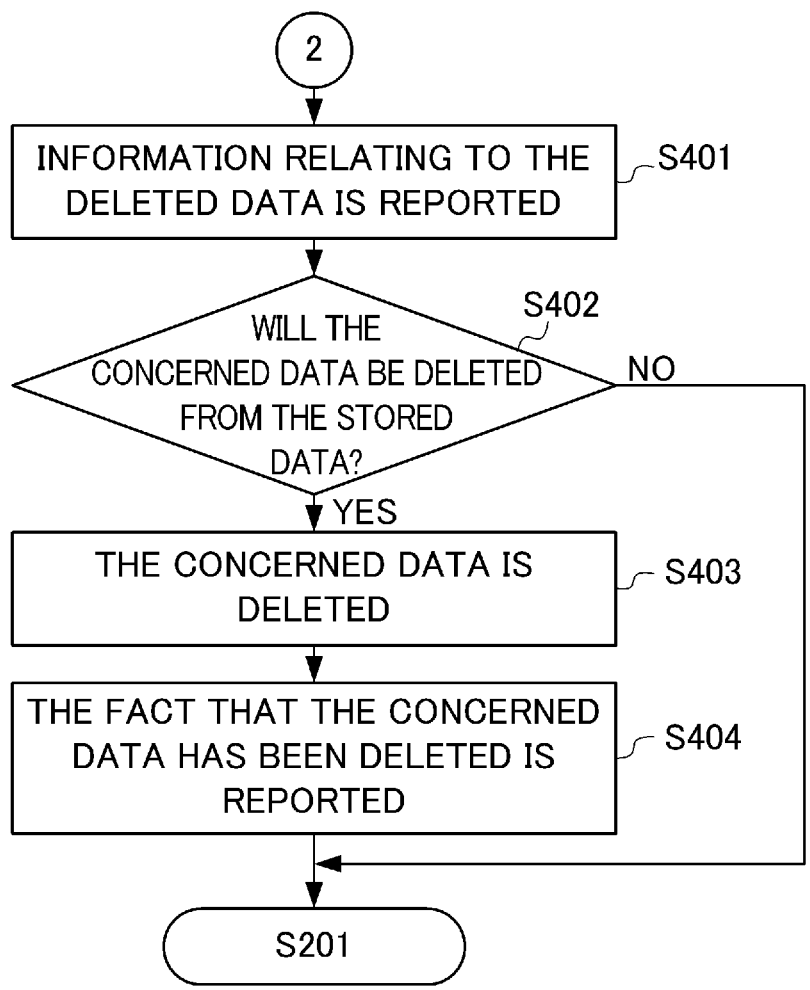
FIG. 8 is a flowchart explaining an example of data deletion processing carried out in the case where it is determined in the data update processing shown in FIG. 6 that the concerned data has been deleted.

In Step S203, it is determined whether or not data that has been saved in the hard disk drive 362 has been deleted. Specifically, the CPU 371 refers to the deletion date in the attribute data of the received concerned data, and determines whether or not associated data saved in the hard disk drive 362 is deleted. In a case where the CPU 371 determines that the data saved in the hard disk drive 362 is deleted, data deletion processing, which is described below, is executed. In a case where the CPU 371 determines that the data saved in the hard disk drive 362 is not deleted, the processing advances to Step S204, but in the case where it is determined that the saved data is to be deleted, the processing advances to (2) (FIG. 8). Further, the CPU 371 judges whether or not the attribute data of the data saved in the hard disk drive 361 is included in the attribute data of the concerned data received in step S201. If it is judged that the attribute data of the data saved in the hard disk drive 361 is included in the attribute data of the concerned data received in step S201, the processing advances to Step S204, and if it is judged that the attribute data of the data saved in the hard disk drive 361 is not included in the attribute data of the concerned data received in step S201, the processing advances to (2) (FIG. 8).

In Step S204, it is determined whether or not previously stored data has been modified. Specifically, the CPU 371 refers to the modification date in the attribute data of the received concerned data, and determines whether or not the concerned data has been modified since the previous update date. In a case where the modification date of the attribute data is subsequent to the previous update date, the CPU 371 determines that the concerned data has been modified, and executes data modification processing, which is described below (advances to (3) (FIG. 9)). In a case where the modification date of the attribute data is not subsequent to the previous update date, the CPU 371 determines that the concerned data has not been modified and returns to Step S201. Therefore, even in a case where data that is to be used is updated at a local computer, the data may be retained in an immediately usable state without there being a time lag from deciding to employ the data to attaining a state in which employment is possible.

Figure 7:
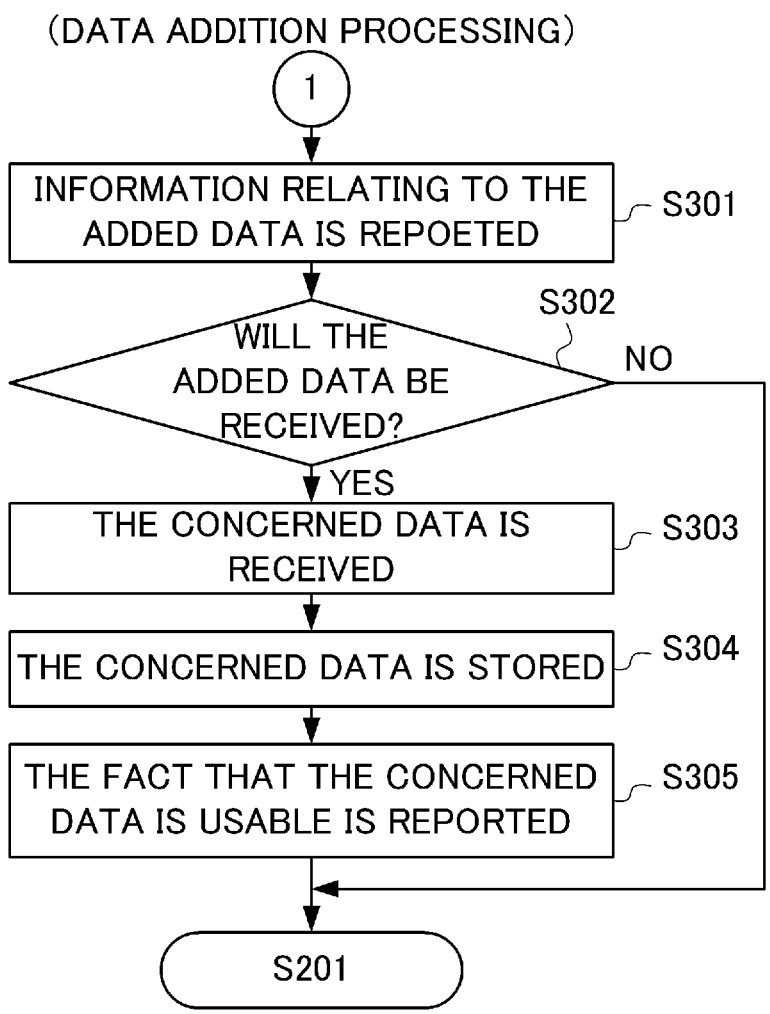
FIG. 7 is a flowchart explaining an example of data addition processing carried out in the case where it is determined in the data update processing shown in FIG. 6 that the concerned data has been newly added.

FIG. 7 is a flowchart describing the example of data addition processing that is executed in the case where it is determined in Step S202 of FIG. 6 that the concerned data has been newly added.

Referring to FIG. 7, firstly, in Step S301, information relating to the added data is reported. Specifically, the controller control section 391 is controlled and the attribute data of the concerned data received via the transmission and reception section 315 is displayed at the display 210. In Step S302, the CPU 371 determines whether or not to receive the concerned data. Specifically, it is determined whether or not to receive the added data. Specifically, it is determined whether or not the user has operated the keyboard 112, the mouse 113 or the like and inputted an instruction to receive the concerned data via the controller control section 391. If it is determined that the user has operated the keyboard 112, the mouse 113 or the like and inputted an instruction to receive the concerned data via the controller control section 391, the processing advances to Step S303, and the CPU 371 controls the transmission and reception section 315 to receive the concerned data. On the other hand, if the CPU 371 determines that an instruction to receive the concerned data has not been inputted by the user, the processing returns to Step S201 (FIG. 6).

In Step S304, the data is stored. Specifically, the CPU 371 controls the hard disk controller 361 to save in the hard disk drive 362, the data received via the transmission and reception section 315. In Step S305, it is reported that the concerned data is usable. Specifically, the CPU 371 controls the controller control section 391 to display the fact that the concerned data is usable at the display 210. Therefore, even in a case where data that is to be used is added at a local computer, the data may be retained in an immediately usable state without there being a time lag from deciding to employ the data to attaining a state in which employment is possible. Further, because the reception of concerned data is started after the attribute data of the concerned data has been reported via the display 210, a user may consider whether or not to receive the added actual data in advance, and not carry out reception of the added actual data in cases where this is unnecessary. Thus, even in cases where the data is large-volume data, such as video or the like, system resources can be utilized efficiently.

FIG. 8 is a flowchart describing the example of data deletion processing that is executed in the case where it is determined in Step S203 of FIG. 6 that the concerned data has been deleted.

Referring to FIG. 8, firstly, in Step S401, information relating to the deleted data is reported. Specifically, the controller control section 391 is controlled and the attribute data of the data that has been determined as being deleted in Step S203 (FIG. 6) is displayed at the display 210. In Step S402, it is determined whether or not to delete the concerned data. Specifically, the CPU 371 determines whether or not an instruction to delete the associated data has been inputted by the user. If the CPU 371 determines that the user has operated the keyboard 112, the mouse 113 or the like and inputted an instruction to delete the associated data via the controller control section 391, the processing advances to Step S403, and the associated data is deleted. Specifically, in step S403, the CPU 371 controls the hard disk controller 361 to delete the associated data from the hard disk drive 362. On the other hand, if the CPU 371 determines that an instruction to delete the concerned data has not been inputted by the user, the processing returns to Step S201 (FIG. 6). In Step S404, it is reported that the associated data has been deleted. Specifically, the CPU 371 controls the controller control section 391 to display the fact that the concerned data has been deleted at the display 210. Therefore, even in a case where data that is to be used is deleted at a local computer, the data already in the hard disk drive 362 may be deleted too. Thus, even in cases where the data is large-volume data, such as video or the like, system resources can be utilized efficiently. Further, because concerned data is deleted after the attribute data of the concerned data has been reported via the display 210, a user may consider whether or not to delete actual data that has been deleted at a local computer from the hard disk drive 362 in advance and, even in cases where data has been deleted at a local computer, the data may be not deleted from the hard disk drive 362 in necessary cases. Thus, cases of important data being automatically deleted from the hard disk drive 362 can be avoided.

Figure 9:
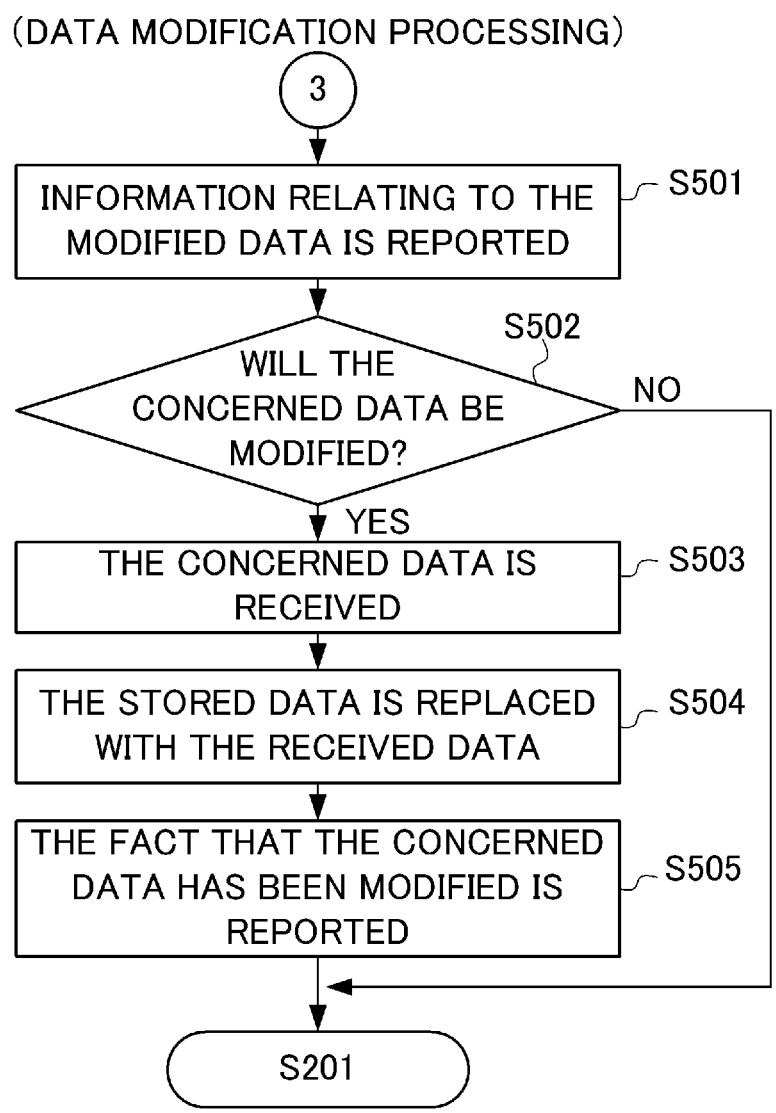
FIG. 9 is a flowchart explaining an example of data addition processing carried out in the case where it is determined in the data modification processing shown in FIG. 6 that the concerned data has been modified.

FIG. 9 is a flowchart describing the example of data processing that is executed in the case where it is determined in Step S204 of FIG. 6 that the stored data has been modified.

Referring to FIG. 9, firstly, in Step S501, information relating to the modified data is reported. Specifically, the controller control section 391 is controlled and the attribute data of the data that has been determined as being modified in Step S204 (FIG. 6) is displayed at the display 210. In Step S502, it is determined whether or not to modify the associated data. Specifically, the CPU 371 determines whether or not an instruction to modify the associated data has been inputted by the user. If it is determined in step S502 that the user has operated the keyboard 112, the mouse 113 or the like and inputted an instruction to modify the associated data via the controller control section 391, the processing advances to Step S503, in which the associated data is received. Then, the processing advances to Step S504, in which the stored data is replaced with the received data. Specifically, in step S503, the CPU 371 controls the transmission and reception section 315 to receive the associated data, and, in step S504, the CPU 371 controls the hard disk controller 361 to replace the concerned data saved in the hard disk drive 362 with the associated data received via the transmission and reception section. Alternatively, the CPU 371 may control the hard disk controller 361 to save the data newly received via the transmission and reception section 315 with a version later than a version of the concerned data already saved in the hard disk drive 362. On the other hand, if the CPU 371 determines in step S502 that there is no instruction to modify the associated data from the user, the processing returns to Step S201 (FIG. 6). In Step S505, it is reported that the associated data has been modified. Specifically, the CPU 371 controls the controller control section 391 to display the fact that the associated data has been modified at the display 210. Therefore, even in a case where data that is to be used is modified at a local computer, the data may be retained in an immediately usable state without there being a time lag from deciding to employ the data to attaining a state in which employment is possible. Further, because concerned data is modified after the attribute data of the concerned data has been reported via the display 210, a user may consider in advance whether or not to replace the actual data in the hard disk drive 362 with the actual data that has been modified at the local computer and, even in cases where data has been modified at a local computer, the actual data in the hard disk drive 362 may be not modified in necessary cases. Thus, cases of important data being automatically revised out of the hard disk drive 362 can be avoided.

In the present embodiment, a user operates the keyboard 112, the mouse 113 or the like of the automatic search and transfer apparatus 1 so as to input a keyword via the controller control section 391. However, the present invention is not limited thus. The user computer 5 may be operated and the keyword directly inputted to the automatic search and transfer apparatus 1 via the transmission and reception section 315.

As described hereabove, when a user operates the controller control section 391 and inputs a keyword, the present embodiment of the automatic search and transfer apparatus 1 searches for data including the keyword from the computers 2 to 4 connected via the network, acquires the attribute data of concerned data, reports information relating to the concerned data via the display 210, and then receives the concerned data via the transmission and reception section 315 and saves the concerned data in the hard disk drive 362. After the actual data has been saved in the hard disk drive 362, it is again reported to a user via the display 210 that the concerned data is usable. Thus, by specifying, for example, a keyword as a condition for finding desired data beforehand, data created at network-connected computers may be constantly monitored, and data that matches conditions such as the keyword and the like may be automatically collected and put into a usable state. Moreover, because the actual data is received after the attribute data of the concerned data has been reported at the display 210, the user is reported to in advance of reception of the actual data, and a response may be considered.

Further, at predetermined time intervals, the present embodiment of the automatic search and transfer apparatus 1 searches for data including the above-mentioned keyword from the computers 2 to 4, and updates the data saved in the hard disk drive 362 in accordance with the data saved in the computers 2 to 4. Thus, the data saved in the hard disk drive 362 may be constantly updated to match the data at the local computers, such that a user can immediately use the most up-to-date data.

(Second Embodiment)

Firstly, schematics of a second embodiment of the automatic search and transfer system according to the present invention are described with reference to FIG. 10 and FIG. 11.

Figure 10:
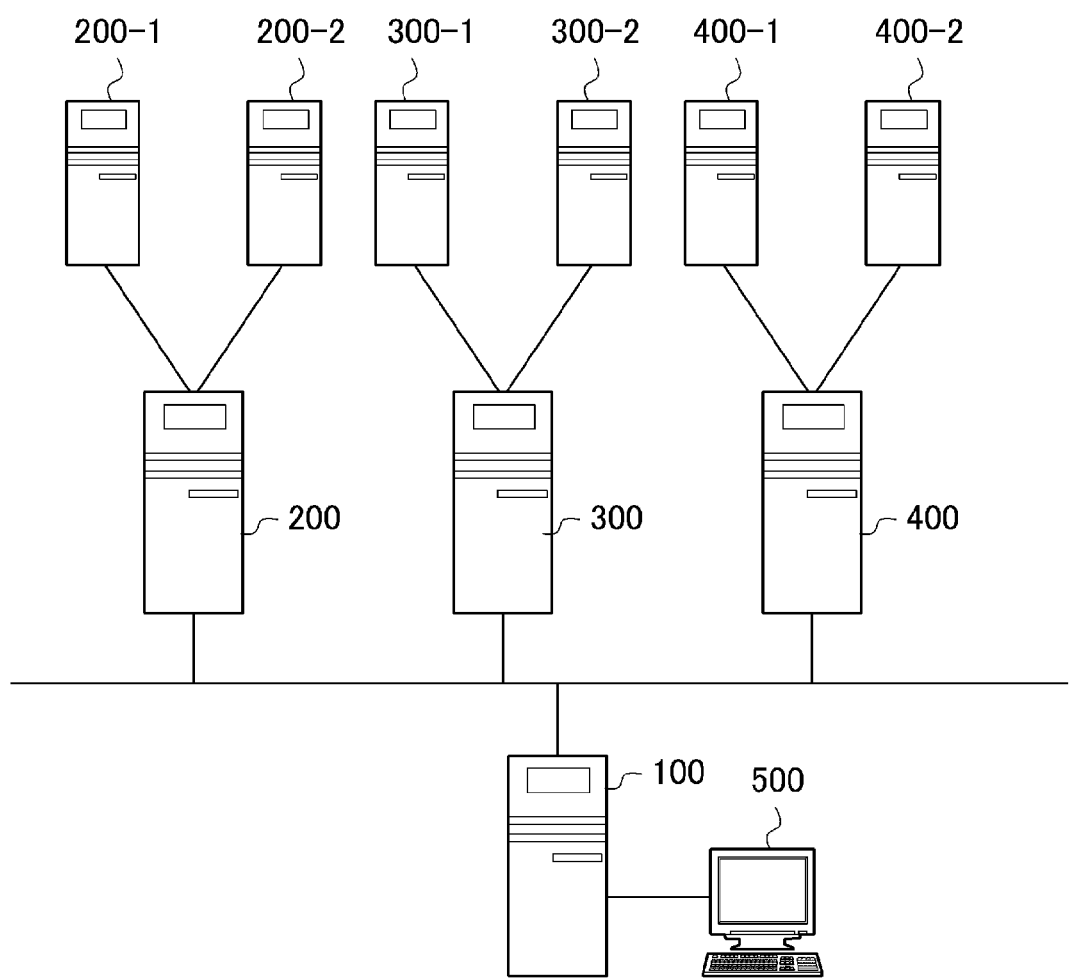
FIG. 10 is a schematic block diagram showing a second embodiment of an automatic search and transfer system according to the present invention, connected with a plurality of automatic search and transfer apparatuses via a network.

FIG. 10 shows the second embodiment of the automatic search and transfer system, which includes a user computer terminal 500 and automatic search and transfer apparatuses 100, 200, 300 and 400 that are connected via a network.

Each of the automatic search and transfer apparatuses 100, 200, 300 and 400 is connected with other computers via a network. Constitutions of the automatic search and transfer apparatuses 100, 200, 300 and 400 are substantially the same as the constitution of the first embodiment of the automatic search and transfer apparatus 1 described with reference to FIGS. 1 to 9, and the same reference numerals are used and detailed descriptions are omitted. Operation of each of the automatic search and transfer apparatuses 100, 200, 300 and 400 of the present embodiment of the automatic search and transfer system is substantially the same as operation of the first embodiment of the automatic search and transfer apparatus 1, except in that the other automatic search and transfer apparatuses are included among computers that are objects of searching.

FIG. 11 is a flowchart describing an example of automatic search and transfer processing that is executed by the automatic search and transfer system shown in FIG. 10. Because the operation of each of the automatic search and transfer apparatuses 100, 200, 300 and 400 of the present embodiment of the automatic search and transfer system is substantially the same except in that the other automatic search and transfer apparatuses are included among computers that are objects of searching, descriptions will be given focusing on automatic search and transfer processing that is carried out by the automatic search and transfer apparatus 100, between the automatic search and transfer apparatus 100 and the other automatic search and transfer apparatuses 200 to 400.

The CPU 371 that constitutes the control section of the automatic search and transfer apparatus 100 instructs the controller control section 391 to display the user interface at the display 210 and the system monitor 135. In the present embodiment, it is assumed that he automatic search and transfer apparatuses 200, 300 and 400 are connected with other computers 200-1 and 200-2, 300-1 and 300-2, and 400-1 and 400-2, respectively, via the networks.

Referring to FIG. 11, firstly, in Step S601, a user operates the keyboard 112, the mouse 113 or the like of the automatic search and transfer apparatus 100, and inputs a preferred keyword. Specifically, the CPU 371 of the automatic search and transfer apparatus 100 stores the keyword inputted from the user in the memory 381, via the controller control section 391. In Step S602, the CPU 371 searches for data including the inputted keyword from the automatic search and transfer apparatuses 200 to 400, and acquires corresponding attribute data. Specifically, the CPU 371 controls the transmission and reception section 315 of the automatic search and transfer apparatus 100 and sends, to the automatic search and transfer apparatuses 200 to 400, signals enquiring as to whether or not the automatic search and transfer apparatuses 200 to 400 have data including the keyword stored in the memory 381 and, in cases where the automatic search and transfer apparatuses 200 to 400 have data including the keyword, requesting that attribute data of the data including the keyword, i. e., concerned data, be sent. In a case where concerned data is present in the respectively connected computers 200-1 and 200-2, 300-1 and 300-2, 400-1 and 400-2, or the like, the automatic search and transfer apparatuses 200 to 400 have already received or receive the attribute data of the concerned data, which is to be sent from the automatic search and transfer apparatuses 200 to 400, via the transmission and reception sections 315 and save the attribute data in the memories 381. Here, each of the automatic search and transfer apparatuses 200 to 400 performs operations the same as the first embodiment of the automatic search and transfer apparatus 1. Specifically, on the basis of the keyword sent from the automatic search and transfer apparatus 100, enquiries are performed to the respectively connected computers 200-1 and 200-2, 300-1 and 300-2, 400-1 and 400-2, or the like, the attribute data of the concerned data is saved to the respective memories and the corresponding actual data is saved to the respective hard disk drives in cases where necessary.

In Step S603, information relating to the concerned data is reported. Specifically, the CPU 371 of the automatic search and transfer apparatus 100 reports to the user the attribute data of the concerned data saved in the memory 381. Specifically, the CPU 371 controls the controller control section 391 to display the attribute data at the display 210. In Step S604, the CPU 371 determines whether or not to receive the concerned data. Specifically, the CPU 371 determines whether or not an instruction to receive the concerned data has been inputted by the user. If it is determined that the user has operated the keyboard 112, the mouse 113 or the like and inputted an instruction to receive the concerned data via the controller control section 391, the processing advances to Step S605, and the concerned data is received. Specifically, the CPU 371 controls the transmission and reception section 315 to receive the concerned data. On the other hand, if the CPU 371 determines that an instruction to receive the concerned data has not been inputted by the user, the processing returns to Step S602.

In Step S606, the concerned data is stored. Specifically, the CPU 371 controls the hard disk controller 361 to save the received data in the hard disk drive 362. In Step S607, it is reported that the concerned data is usable. Specifically, the CPU 371 controls the controller control section 391 and displays the fact that the concerned data is usable at the display 210. Therefore, when a user operates the controller control section 391 and requests desired data from the stored data, the CPU 371 can send concerned data from the data saved in the hard disk drive 362 to the user computer 5, via the transmission and reception section 315, in real time. Moreover, because the reception of concerned data is started after the acquisition of the attribute data of the concerned data has been reported via the display 210, a user may consider reception of the actual data in advance and not carry out reception of the actual data in cases where this is unnecessary. Thus, even in cases where the data is large-volume data, such as video or the like, system resources can be utilized efficiently.

Operations to continuously update the data stored in the automatic search and transfer apparatus 100 are substantially the same as the operations of the first embodiment of the automatic search and transfer apparatus 1, except in that the other automatic search and transfer apparatuses are included among the computers that are objects of searching. The principal elements of operation with the other automatic search and transfer apparatuses being included among the computers that are objects of searching have been described with reference to FIG. 11, so will not be given.

As described hereabove, when a user operates the controller control section 391 and inputs a keyword at an automatic search and transfer apparatus of those constituting the present embodiment of the automatic search and transfer system, the automatic search and transfer system searches for data including the keyword from the computers including the other automatic search and transfer apparatuses which are connected via the network, acquires the attribute data of concerned data, reports information relating to the concerned data via the display 210, and then receives the concerned data via the transmission and reception section 315 and saves the concerned data in the hard disk drive 362. After the actual data has been saved in the hard disk drive 362, it is again reported to a user via the display 210 that the concerned data is usable. Thus, by specifying a condition for finding desired data beforehand, data created at network-connected computers may be constantly monitored, and data that matches the condition may be automatically collected and put into a usable state. Moreover, because the actual data is received after the attribute data of the concerned data has been reported at the display 210, the user is reported to in advance of reception of the actual data, and a response may be considered.

Further, in the present embodiment of the automatic search and transfer system, at predetermined time intervals, each of the automatic search and transfer apparatuses constituting the automatic search and transfer system searches for data including the above-mentioned keyword from the computers including the other automatic search and transfer apparatuses that are connected via the network, and updates the data saved in the hard disk drive 362 in accordance with the data saved in the network-connected computers. Thus, the data saved in the hard disk drive 362 may be constantly updated to match the data at local computers, such that a user can immediately use the most up-to-date data.

Embodiments of the present invention have been described hereabove, but the present invention is not limited to the above-described embodiments. Furthermore, the effects described in the embodiments of the present invention represent no more than an enumeration of favorable examples of the effects that can be achieved by the present invention, and the effects of the present invention are not limited to those described for the embodiments of the present invention.

The invention claimed is:

1. A search and transfer apparatus that searches for and transfers data from one or more computers connected to the apparatus via a network to a user, the apparatus comprising:
    a keyword input section that inputs at least one keyword set by the user;
    a search section that searches for data including the at least one keyword set by the user and acquires attribute data of concerned data from the one or more computers connected to the apparatus via the network;
    a reporting section that reports information relating to the concerned data to a user;
    a reception section in the search and transfer apparatus that receives the concerned data from the one or more computers based on an instruction by the user for the reception of the all or part of the concerned data on the basis of the attribute data; and
    a data storage section that stores the concerned data, wherein
    when the attribute data of the concerned data is acquired from the one or more computers by the reception section, the reporting section reports the acquisition of the attribute data to the user, and
    after the reporting section has reported the acquisition of the attribute data to the user and received the instruction for the reception of the all or part of the concerned data selected by the user on the basis of the attribute data, the reception section starts reception of all or part of the concerned data from the one or more computers, and
    the all or part of the concerned data stored on the data storage is sent to the user on demand.

2. The apparatus according to claim 1, wherein the search section searches for data including the at least one keyword from the one or more computers at predetermined time intervals, and in a case where concerned data has been newly added at the one or more computers, the reporting section reports information relating to the newly added concerned data, the reception section receives the newly added concerned data, and the data storage section stores the newly added concerned data.

3. The apparatus according to claim 1, wherein the search section searches for data including the at least one keyword from the one or more computers at predetermined time intervals, and in a case where concerned data previously stored at the data storage section has been deleted at the one or more computers, the reporting section reports information relating to the concerned data that has been deleted at the one or more computers, and the data storage section deletes the concerned data that has been deleted at the one or more computers.

4. The apparatus according to claim 1, wherein the search section searches for data including the at least one keyword from the one or more computers at predetermined time intervals, and in a case where concerned data previously stored at the data storage section has been modified at the one or more computers, the reporting section reports information relating to the modified concerned data, the reception section receives the modified concerned data, and the data storage section replaces the concerned data previously stored at the data storage section with the modified concerned data.

5. The apparatus according to claim 1 wherein, when the data is stored at the data storage section, the reporting section reports to the user that the data is transferable.

6. The apparatus according to claim 2 wherein, when the data is deleted from the data storage section, the reporting section reports to the user that the data is untransferable.

7. The apparatus according to claim 3 wherein, when the data stored at the data storage section is modified, the reporting section reports to the user that the data has been modified.

8. A search and transfer system comprising a search and transfer apparatus for each of a plurality of groups each having one or more computers connected to the apparatus via a network, the search and transfer apparatus being operative to search for and transfer data from one or more computers connected to the apparatus via a network to a user, and the apparatus including:
- a keyword input section that inputs at least one keyword set by the user;
- a search section that searches for data including the at least one keyword set by the user and acquires attribute data of concerned data from the one or more computers connected to the apparatus via the network;
- a reporting section that reports information relating to the concerned data to a user;
- a reception section in the search and transfer system that receives the concerned data from the one or more computers based on an instruction by the user for the reception of the all or part of the concerned data on the basis of the attribute data; and
- a data storage section that stores the concerned data,
- wherein the reporting section reports acquisition of the attribute data of the concerned data to the user when the attribute data is acquired from the one or more computers, and the reception section starts reception of the concerned data from the one or more computers after the reporting section has reported the acquisition of the attribute data of the concerned data to the user, the all or part of the concerned data stored on the data storage is sent to the user on demand, wherein
- in one automatic search and transfer apparatus of one group selected from the plurality of groups, the search section is operative to search for data including the at least one keyword and acquire attribute data of concerned data from the search and transfer apparatuses of the other groups, the reporting section is operative to report information relating to the concerned data to the user; the reception section is operative to receive the concerned data from the apparatuses of the other groups; and the data storage section is operative to store the concerned data,
- wherein the reporting section is operative to report acquisition of the attribute data of the concerned data to the user when the attribute data is acquired, and
- wherein the reception section is operative to start reception of all or part of the concerned data from the apparatuses of the other groups after the reporting section has reported the acquisition of the attribute data of the concerned data to the user and received the instruction for the reception of the all or part of the concerned data selected by the user on the basis of the attribute data, the all or part of the concerned data stored on the data storage is sent to the user on demand.

9. A method for searching for and transferring data from one or more computers connected via a network, the method comprising the steps of:
- inputting at least one keyword set by a user;
- searching for data including the at least one keyword set by the user and acquiring attribute data of concerned data from the one or more computers connected via the network;
- receiving the concerned data from the one or more computers on a search and transfer apparatus based on an instruction by the user for the reception of the all or part of the concerned data on the basis of the attribute data; and
- storing the concerned data in a data storage,
- wherein the method further comprises a step of reporting acquisition of the attribute data of the concerned data to the user when the attribute data is acquired from the one or more computers;
- wherein the step of receiving the concerned data from the one or more computers is started to receive all or part of the concerned data after the steps of reporting acquisition of the attribute data to the user and receiving the instruction for receiving the all or part of the concerned data selected by the user on the basis of the attribute data have been performed; and
- wherein the all or part of the concerned data stored on the data storage is sent to the user on demand.

* * * * *